United States Patent
Andersson et al.

(10) Patent No.: US 12,145,217 B2
(45) Date of Patent: Nov. 19, 2024

(54) STENCIL DEVICE AND METHOD FOR STENCIL PRINTING OF BRAZING MATERIAL ONTO A HEAT EXCHANGER PLATE AND USE THEREOF

(71) Applicant: SWEP INTERNATIONAL AB, Landskrona (SE)

(72) Inventors: Sven Andersson, Hässleholm (SE); Tomas Dahlberg, Helsingborg (SE); Niclas Bornegård, Bjärred (SE)

(73) Assignee: SWEP INTERNATIONAL AB, Landskrona (SE)

( * ) Notice: Subject to any disclaimer, the term of this patent is extended or adjusted under 35 U.S.C. 154(b) by 506 days.

(21) Appl. No.: 17/442,228

(22) PCT Filed: Apr. 1, 2020

(86) PCT No.: PCT/SE2020/050339
§ 371 (c)(1),
(2) Date: Sep. 23, 2021

(87) PCT Pub. No.: WO2020/204798
PCT Pub. Date: Oct. 8, 2020

(65) Prior Publication Data
US 2022/0184725 A1 Jun. 16, 2022

(30) Foreign Application Priority Data
Apr. 4, 2019 (SE) .................. 1950419-0

(51) Int. Cl.
*B23K 3/08* (2006.01)
*B23K 1/00* (2006.01)
(Continued)

(52) U.S. Cl.
CPC .......... *B23K 3/0607* (2013.01); *B23K 1/0012* (2013.01); *B23K 3/0638* (2013.01);
(Continued)

(58) Field of Classification Search
None
See application file for complete search history.

(56) References Cited

U.S. PATENT DOCUMENTS 6,247,632 B1 6/2001 Howell
9,103,597 B2 * 8/2015 Christensen ............ F28F 3/046
(Continued)

FOREIGN PATENT DOCUMENTS

CN 104302439 A 1/2015
CN 105140194 A 12/2015
(Continued)

OTHER PUBLICATIONS

International Search Report for International Application No. PCT/SE2020/050339 mailed Aug. 14, Jun. 2020 (4 pages).
(Continued)

*Primary Examiner* — Jethro M. Pence
(74) *Attorney, Agent, or Firm* — Merchant & Gould P.C.

(57) ABSTRACT

The present application relates to a stencil device (150) for simultaneous stencil printing of brazing material onto elevations, areas surrounding port openings, and a circumferential skirt (210) of a heat exchanger plate (200) wherein the stencil device (150) comprises an upper stencil having openings for applying brazing material to elevations and areas surrounding port openings of the heat exchanger plate (200) and a lower stencil printing stencil (150) having a large opening (190) for receiving the heat exchanger plate (200) and contacting an outer perimeter of the circumferential skirt (210) of the heat exchanger plate (200), wherein an inner surface (195) of the large opening (190) comprises brazing material exits (160) for applying brazing material to the circumferential skirts (195). Disclosed is also a method
(Continued)

of such stencil printing and also the use of a stencil device for applying heat exchanger plates (200) with a brazing material.

16 Claims, 3 Drawing Sheets

(51) Int. Cl.
| | |
|---|---|
| *B23K 3/06* | (2006.01) |
| *B23K 37/04* | (2006.01) |
| *B23K 37/06* | (2006.01) |
| *F28D 9/00* | (2006.01) |
| *F28F 3/10* | (2006.01) |
| *B23K 103/04* | (2006.01) |

(52) U.S. Cl.
CPC .......... *B23K 37/0408* (2013.01); *B23K 37/06* (2013.01); *F28D 9/005* (2013.01); *F28F 3/10* (2013.01); *B23K 2103/05* (2018.08); *F28F 2275/045* (2013.01)

(56) References Cited

U.S. PATENT DOCUMENTS

| | | | |
|---|---|---|---|
| 10,916,689 B2* | 2/2021 | Vakkalanka | ............ H01L 33/60 |
| 2004/0181941 A1 | 9/2004 | Johannes Rassmus | |
| 2010/0089625 A1 | 4/2010 | Kluge | |
| 2016/0214215 A1 | 7/2016 | Wakamatsu | |
| 2021/0197325 A1* | 7/2021 | Martinez | ................ B23K 37/06 |
| 2023/0036224 A1* | 2/2023 | Andersson | ............ F25B 39/022 |

FOREIGN PATENT DOCUMENTS

| | | |
|---|---|---|
| CN | 105705284 A | 6/2016 |
| CN | 106895725 A | 6/2017 |
| CN | 107883792 A | 4/2018 |
| JP | H09-178384 A | 7/1997 |
| JP | 2000-337789 A | 12/2000 |
| JP | 2014-185803 A | 10/2014 |

OTHER PUBLICATIONS

Written Opinion for International Application No. PCT/SE2020/050339 mailed Aug. 14, 2020 (5 pages).

English Translation of Chinese Office Action issued on Dec. 1, 2022 with search report for corresponding Application No. 202080026888.X (8 pages).

\* cited by examiner

STENCIL DEVICE AND METHOD FOR STENCIL PRINTING OF BRAZING MATERIAL ONTO A HEAT EXCHANGER PLATE AND USE THEREOF

This application is a National Stage Application of PCT/SE2020/050339, filed 1 Apr. 2020, which claims benefit of Serial No. 1950419-9, filed 4 Apr. 2019 in Sweden, and which applications are incorporated herein by reference. To the extent appropriate, a claim of priority is made to each of the above disclosed applications.

FIELD OF THE INVENTION

The present invention relates to a stencil device for simultaneous stencil printing of brazing material onto ridges, areas surrounding port openings, and a circumferential skirt of a heat exchanger plate. The present invention also relates to the use of such a device and to a method for printing of brazing material onto a heat exchanger plate.

PRIOR ART

Brazed plate heat exchangers are generally manufactured from plates made from sheet metal that has been provided with a pressed pattern of ridges and grooves adapted to keep the plates on a distance from one another such that interplate flow channels for media to exchange heat are formed between the plates. In order to keep the plates together, they are brazed to one another in the contact points between the ridges and grooves of neighbouring plates. Port openings are provided—often near corners of the heat exchanger plates—and areas surrounding the port openings are provided on different heights such that selective fluid communication between the port openings and the interplate flow channels is achieved.

In order to seal the interplate flow channels such that the fluids to exchange heat do not escape the interplate flow channels formed by the heat exchanger plates, some kind of circumferential seal is necessary. In most cases, the circumferential seal is provided by skirts extending along the circumference of each plate, wherein skirts extend in a plane close to perpendicular to the plane of the heat exchanger plate and are adapted to overlappingly contact one another, hence providing for the circumferential seal.

When manufacturing brazed heat exchangers, it is necessary to provide a brazing material to the surface that are supposed to be brazed together, i.e. in many cases, such brazing material is provided by arranging a foil of brazing material (e.g. copper or nickel if the heat exchanger plates are made from stainless steel) between the heat exchanger plates.

However, in case the base material, i.e. the material from which the heat exchanger plates are manufactured, is dissolved by the brazing material (for example if an iron based brazing material containing melting point depressants is used for brazing heat exchanger plates made from stainless steel), providing the brazing material in form of a foil has many disadvantages. When using such brazing material/base material combinations, it is therefore common to provide the brazing material at or in the vicinity of contact points between the heat exchanger plates.

One efficient way of providing such brazing material to heat exchanger plates is to stencil print the brazing material on the heat exchanger plates, see e.g. JP 33 77 89. Another Japanese patent publication, JPH 09178384, discloses stencil printing of flat-brazed sealing edges that are arranged in the circumference of the heat exchanger plates. However, it has hitherto not been possible to provide brazing material to circumferential "skirt seals" by stencil printing. Rather, such skirt seals have hitherto been applied with brazing material by dispensing, brushing, spraying or dipping of the skirt in a pool of brazing material dispensed in a paint-like slurry. This is a drawback in terms of production economy.

It is the object of the present invention to provide a method for applying brazing material to the circumferentially extending skirts by stencil printing. Another object of the present invention is to provide a stencil for enabling such stencil printing.

SUMMARY OF THE INVENTION

The present invention solves the above and other problems by providing a stencil device for simultaneous stencil printing of brazing material onto elevations, areas surrounding port openings, and a circumferential skirt of a heat exchanger plate in that the stencil device comprises an upper stencil having openings for applying brazing material to the elevations and areas surrounding port openings of the heat exchanger plate and a lower printing stencil having a large opening for receiving a heat exchanger plate and contacting an outer perimeter of the circumferential skirt of the heat exchanger plate, wherein an inner surface of the large opening comprises brazing material exits for applying brazing material to the circumferential skirts.

In order to supply the brazing material exits with brazing material, canals may be arranged between circumferential openings of the upper stencil and the brazing material exits such that brazing material will be pressed from the circumferential openings through the canals to the brazing material exits.

In order to facilitate manufacturing of the stencil device the upper stencil may be manufactured from sheet metal, rubber, plastic, fabric or the like.

In order to minimize the necessary amount of brazing material, openings of the upper stencil may be placed in pairs, wherein each opening of each pair is placed such that it will be located close to, but not at, a contact point between an elevation and a depression of neighboring heat exchanger plates.

The lower stencil printing stencil may be made from a dense material, e.g. plastic or metal, that has a thickness exceeding a height of a circumferential skirt of a heat exchanger plate.

The inner surface of the lower stencil printing stencil may be covered with a resilient material in order to avoid leakage of brazing materiel between said inner surface and an outer surface of a circumferential skirt of the heat exchanger plate to be applied with brazing material.

Moreover, the resilient material may be inflatable to secure a tight fit to the outer surface of the circumferential skirt.

In one embodiment of the invention, the elevations may be in the form of ridges adapted to form contacts with grooves of a neighboring plate when heat exchanger plates are stacked on top of one another.

Disclosed is also a method for simultaneous stencil printing of brazing material onto elevations, areas surrounding port openings, and a circumferential skirt of a heat exchanger plate, comprising the steps of placing the heat exchanger plate in an opening of a lower stencil printing stencil, and bringing an inner surface of the lower stencil printing stencil to contact an outer perimeter of the circumferential skirt of the heat exchanger plate, placing an upper stencil on the heat exchanger plate, applying brazing material to elevations and areas surrounding port openings of the heat exchanger plate through openings in the upper stencil, and applying brazing material to the circumferential skirt through brazing material exits in the inner surface of the lower stencil printing stencil.

The brazing material can be conveyed to the brazing material exits by canals arranged between circumferential openings of the upper stencil and the brazing material exits.

BRIEF DESCRIPTION OF THE DRAWINGS

Hereinafter, the present invention will be described by reference to the appended drawings, wherein.

DESCRIPTION OF EMBODIMENTS

As well known by persons skilled in the art, stencil printing is a technology wherein a stencil is provided between an article to be printed and an applicator of the printing material. Openings are provided in the stencil, such that the printing material will be applied to the article to be printed where the holes are provided.

As mentioned in the "prior art" section, the invention is intended to provide a method and a device for applying brazing material to a heat exchanger plate to be comprised in a brazed heat exchanger. Brazed heat exchangers are well known by persons skilled in the art and comprise a multitude of heat exchanger plates provided with a pressed pattern of ridges and grooves adapted to contact ridges and grooves of neighboring plates such that the heat exchanger plates are kept on a distance from one another under formation of interplate flow channels for media to exchange heat. The interplate flow channels are in selective fluid communication with port openings provided in each heat exchanger plate, wherein the selectivity is provided by arranging areas surrounding the port openings on different heights, such that there will be a communication between the port opening and the interplate flow channel if the areas surrounding the port openings of neighbouring heat exchanger plates do not contact one another and such that no communication between port opening and the interplate flow channel will occur when the areas surrounding the port openings of neighbouring heat exchanger plates do contact one another. Finally, a circumferentially extending skirt is provided on each heat exchanger plate, wherein the skirts of neighboring heat exchanger plates are arranged to overlappingly contact one another such that the interplate flow channels are sealed from leakage around the circumference of the heat exchanger plate.

When the brazing of the heat exchanger takes place, the areas surrounding the port openings of neighboring heat exchanger plates contacting one another, the contact points between ridges and grooves of neighboring heat exchanger plates and the overlappingly contacting circumferential skirts are brazed together to seal the heat exchanger and keep the plates together when the heat exchanger is exerted to an internal pressure. It is hence necessary to provide brazing material to all of these areas.

Figure 1:
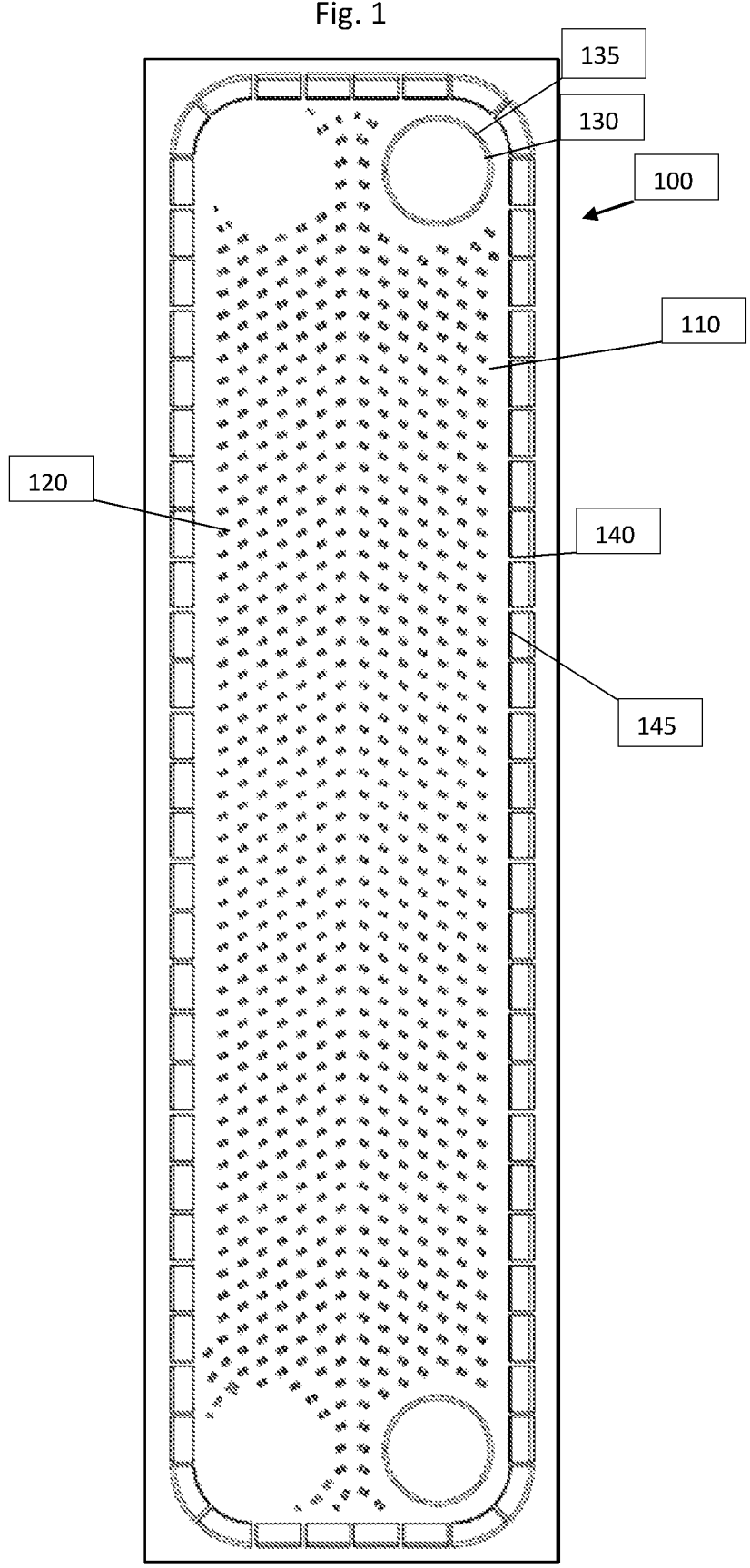
FIG. 1 is a plan view of an upper stencil of a stencil device according to one embodiment of the present invention.

With reference to FIG. 1, a stencil 100 for stencil printing brazing material onto a heat exchanger plate is shown. The stencil 100 is based on a flat base material 110, which e.g. may be manufactured from sheet metal, rubber, plastic, fabric or the like. The stencil 100 is provided with openings 120 for applying brazing material to contact points between ridges and grooves of neighboring heat exchanger plates. It should be noted, however, that the ridges and grooves just as well may be shaped in other shapes than ridges and grooves, e.g. as elevated dots adapted to form contact points between neighboring plates. It should be noted that the openings 120 are placed in pairs, wherein each opening of each pair is placed such that it will be located close to, but not at, a contact point between a ridge and a groove of neighboring heat exchanger plates. In other embodiments of the invention, the openings are not placed in such pairs, but are located at the contact point between ridges and grooves of neighboring heat exchanger plates.

Also, there are two ring-shaped openings 130 for applying brazing material to areas surrounding port openings of the heat exchanger plate to be printed. Please note that inner portions of the ring-shaped openings are not open—rather, there is a stencil portion held in place within each of the ring-shaped openings 130 by means of bridges 135. This central stencil portion will hinder excessive amounts of brazing material to be applied to the areas surrounding the port openings. In some cases, the bridges 135 may lead to a leaking braze connection of the areas surrounding the port openings, but such leakage may be reduced by providing dual ring-shaped openings 130 around each port opening, wherein the bridges 135 are angularly offset with respect to one another.

Additionally, the stencil 100 is provided with circumferential openings 140. The circumferential openings 140 are placed outside a circumference of a heat exchanger plate to be provided with brazing material, and their function will be described with reference to FIGS. 2*a* and 2*b*. In order to keep the stencil portion comprising the openings 120 and ring-shaped openings 130 in place, spokes 145 extend from an area outside the circumferential openings 140 and the stencil portion comprising the openings 120 and the ring-shaped openings 130.

Figure 2A:
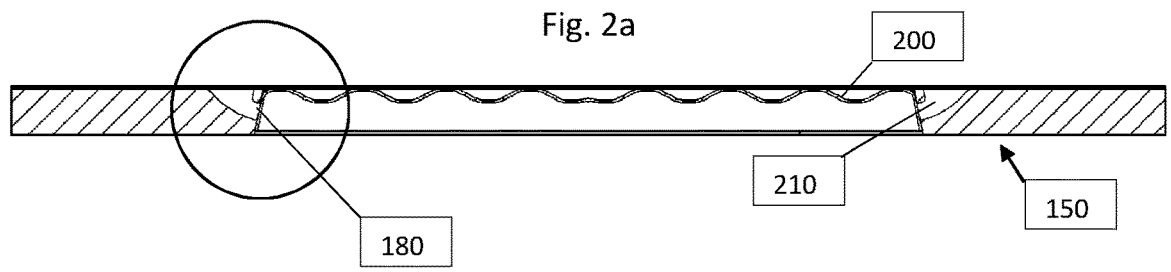
FIG. 2*a* is a cross-section view of a stencil device comprising the upper stencil of FIG. 1 and a lower stencil printing stencil according to one embodiment.
Figure 2B:
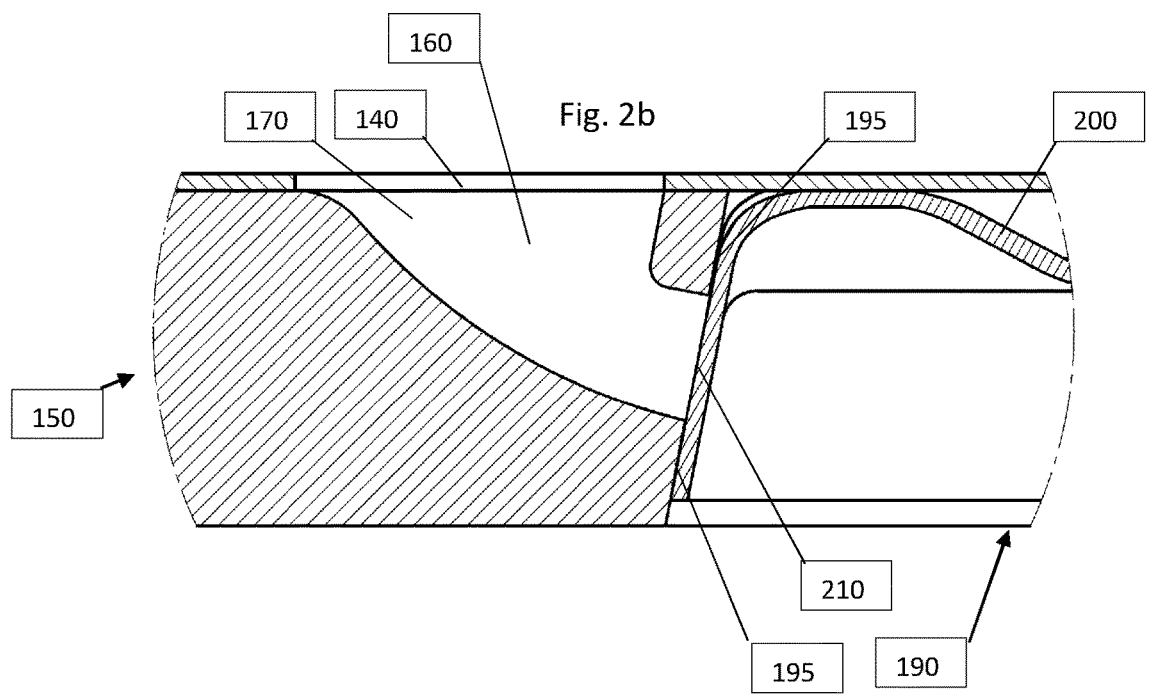
FIG. 2*b* is an enlarged section view of the area indicated by a circle of FIG. 2*a*.
Figure 2C:
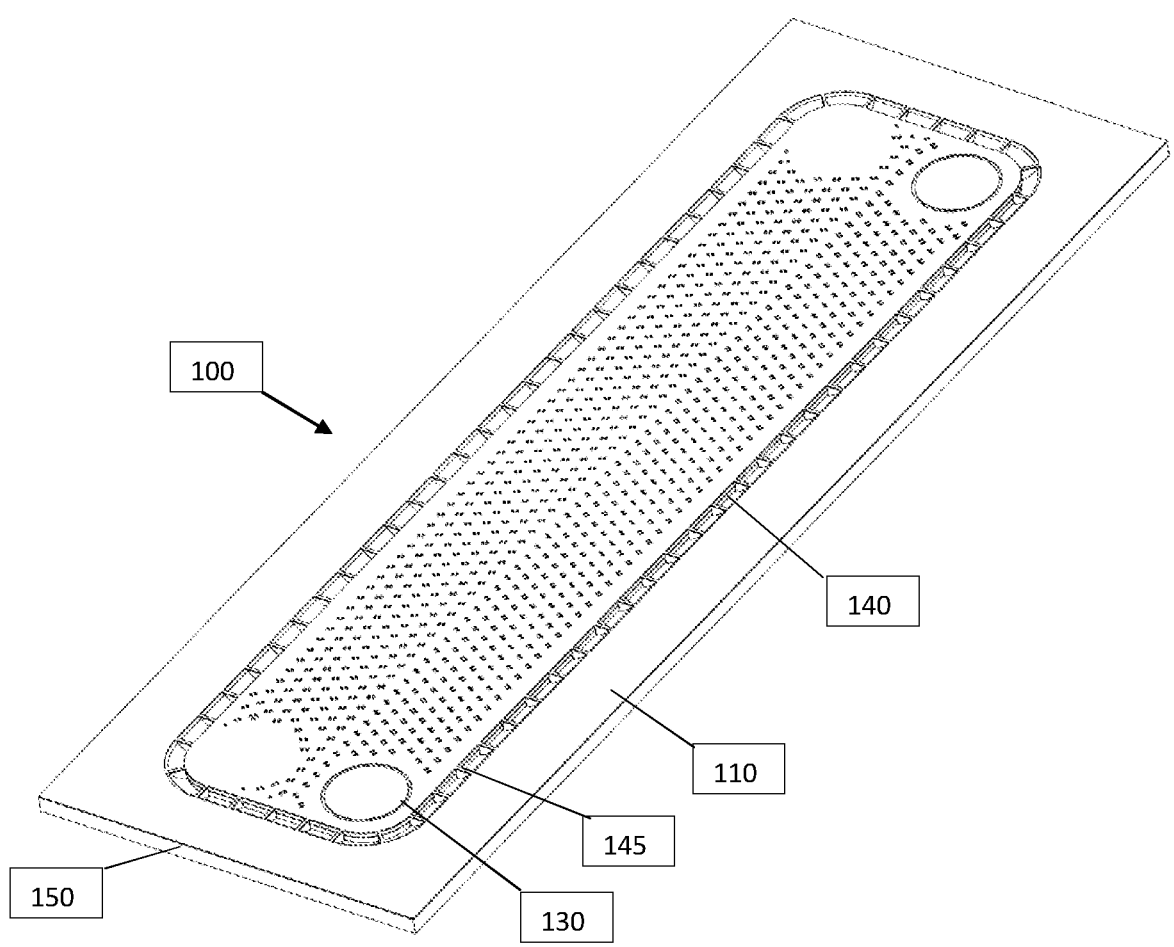
FIG. 2*c* is a perspective view of the stencil device of FIGS. 2*a*-2*b*.

In FIGS. 2*a* and 2*b*, section views of a stencil device including a lower stencil printing stencil 150 is shown. The stencil device comprises the stencil 100 and the lower stencil printing stencil 150, wherein the stencil 100 is an upper stencil. The lower stencil printing stencil 150 is made from a dense material, e.g. plastic or metal, and has a thickness T exceeding a height of a circumferential skirt 210 of a heat exchanger plate 200. The lower stencil printing stencil comprises a large opening 190, an inner surface 195 of which being arranged to closely contact an outer surface of the circumferential skirt 210 of the heat exchanger plate 200.

The inner surface 195 is provided with a number of brazing material exits 180, which are in fluid communication with mouths 170 by canals 160. The brazing material exits, the canals and the mouths are placed such that they mate with the circumferential openings 140 of the stencil 100.

During a stencil printing operation, a heat exchanger plate 200 to be brazed is placed in the large opening 190, and the device is pressed together such that the inner surface 195 closely will fit to the outer surface of the circumferential skirt 210 of the heat exchanger plate and such that the stencil 100 will be in close contact with ridges R and areas surrounding the port openings of the heat exchanger plate 200 to be stencil printed with brazing material.

Then, in order to stencil print the heat exchanger plate, a brazing material paste is applied to the side of the stencil that is not engaging the heat exchanger plate 200, preferably by pushing a "sausage" like string of brazing material over the stencil 100. When pushing the string of brazing material over the stencil 100, brazing material will be pushed through the openings 120 and hence provide brazing material at or close to the contact points between ridges and grooves of neighboring heat exchanger plates, through the ring-shaped openings 130 to provide brazing material to the area surrounding the port openings and through the circumferential openings 140.

The brazing material that is pushed through the circumferential openings 140 will enter the mouths 170, which are fluidly connected to the brazing material exits 180 via the canals 160 and hence, the outer surface of the circumferential skirt 210 will be provided with brazing material.

When the stencil printing process is done, the stencil 100 and the lower stencil printing stencil is carefully removed from the heat exchanger plate and the heat exchanger plates are placed in a stack with other heat exchanger plates in order to form a heat exchanger plate pack to be brazed to a heat exchanger.

It should be noted that in order to get a tight seal between the inner surface 195 of the large opening 190 and the outer surface of the circumferential skirt 210 in order to avoid leakage of brazing material outside the brazing material exits, the inner surface 195 may be coated with a resilient material, e.g. rubber or the like. It may also be advantageous if the resilient material is inflatable by liquid or gas, such that the heat exchanger plate 200 may be placed in and taken away from the large opening 190 without contacting its inner surface 195, while contact may be established by inflating the resilient material during the brazing operation and deflating it after the brazing operation.

During the stencil printing operation, the heat exchanger plate 200 is held in place by an elevated portion (not shown) of a tray (not shown) adapted to host the heat exchanger plates to be printed. The tray may comprise one or more such elevated portions, depending on the number of heat exchanger plates that are supposed to be printed simultaneously. The elevated portions have an outer perimeter corresponding to an inner perimeter of the circumferential skirt 210 of the heat exchanger plate 200, such that the heat exchanger plate is held in place during the stencil printing operation. An upper surface of the elevated portion is designed to provide support for the areas surrounding the port openings of the heat exchanger plate and the ridges and/or grooves that are to be stencil printed.

In one embodiment of the invention, the heat exchanger plate(s) is (are) placed on the tray such that the elevated portion keeps the heat exchanger plate in place. This is sufficient for the stencil printing operation. However, depending on the rheological properties of the brazing material, it might be necessary to lock the heat exchanger plate onto the elevated portion once the stencil printing operation is finished and the upper and lower stencils are removed from contact with the heat exchanger plate. This may be achieved in several ways, of which two deserve to be mentioned:

1. Applying a vacuum source to the elevated portion, such that a vacuum will hold the plate in place during removal of the upper end lower stencils.
2. Retractable locking pins (not shown) extending laterally from the outer perimeter of the elevated portion, said locking pins engaging the inner perimeter of the circumferential skirt 210 for locking the heat exchanger plate to the elevated portion and being retracted in order to release the heat exchanger plate from the elevated portion. In order to avoid deformation of the circumferential skirts, the locking pins are preferably located at corners of the outer perimeter of the elevated portion.

The stencil device and stencil printing method according to the present invention is intended to provide brazing material to areas at or neighboring contact points between heat exchanger plates to be joined by brazing. The brazing material is preferably provided in the form of a paste having a rheological property resembling the properties of peanut butter.

The brazing material paste comprises grains of brazing material, i.e. grains of a metal or an alloy having a melting point lower than the material from which the heat exchanger plates are manufactured, a solvent that may vaporize after the brazing material has been applied to the heat exchanger plate and a binder that keeps the brazing material grains at place after the solvent has evaporated. The binder must have sufficient heat resistance to keep the brazing material together until the brazing material has melted.

Also, the brazing material paste must have excellent adhesive properties in order to adhere properly to the skirts.

One example of a brazing paste that has been proven to work well is the Höganäs BrazeLet® paste, comprising powder brazing material alloy with a grain size of less than 106 Microns, dispersed in a paste having a metal content of 92±1 wt-%, the remainder binder and solvent. The Brookfield viscosity of the paste at 21° C., TD-spindle 2.5 rpm=450±50 Pas.

The invention claimed is:

1. A stencil device for simultaneous stencil printing of brazing material onto elevations, areas surrounding port openings, and a circumferential skirt of a heat exchanger plate, the stencil device comprises;
   an upper stencil having openings for applying the brazing material to the elevations, ring-shaped openings for applying the brazing material to the areas surrounding port openings of the heat exchanger plate, and circumferential openings; and
   a lower stencil printing stencil having an opening for receiving the heat exchanger plate and contacting an outer perimeter of the circumferential skirt of the heat exchanger plate, wherein an inner surface of the opening for receiving the heat exchanger plate and contacting an outer perimeter of the circumferential skirt of the heat exchanger plate comprises brazing material exits for applying the brazing material from the circumferential openings to the circumferential skirt.

2. The stencil device of claim 1, wherein the elevations are ridges adapted to form contact points with crossing grooves of neighboring heat exchanger plates.

3. The stencil device of claim 1, wherein canals are arranged between the circumferential openings of the upper stencil and the brazing material exits for conveying the brazing material to the brazing material exits.

4. The stencil device of claim 1, wherein the upper stencil is manufactured from sheet metal, rubber, plastic or fabric.

5. The stencil device of claim 1, wherein the openings of the upper stencil are placed in pairs, wherein each of the openings of each of the upper stencil pairs is placed such that it will be located close to, but not at, a contact point between a ridge and a groove of neighboring heat exchanger plates.

6. The stencil device of claim 1, wherein the lower stencil printing stencil is made from a dense material and has a thickness T exceeding a height of the circumferential skirt of the heat exchanger plate.

7. The stencil device of claim 6, wherein the lower stencil printing stencil is made from plastic.

8. The stencil device of claim 6, wherein the lower stencil printing stencil is made from metal.

9. The stencil device of claim 1, wherein the inner surface of the lower stencil printing stencil is covered with a resilient material in order to avoid leakage of the brazing material between the inner surface and an outer surface of the circumferential skirt of the heat exchanger plate to be applied with the brazing material.

10. The stencil device of claim 9, wherein the resilient material is inflatable to secure a tight fit to the outer surface of the circumferential skirt.

11. The stencil device of claim 1, further comprising at least one elevated portion of a tray adapted to host the heat exchanger plate to be printed, the at least one elevated portion having an outer perimeter corresponding to an inner perimeter of the circumferential skirt of the heat exchanger plate.

12. The stencil device of claim 11, wherein the elevated portion is provided with means for keeping the heat exchanger plate in place.

13. The stencil device of claim 12, wherein the means is a vacuum that will hold the heat exchanger plate in place.

14. The stencil device of claim 12, wherein the means is retractable locking pins extending laterally from the outer perimeter of the elevated portion, said locking pins engaging the inner perimeter of the circumferential skirt for locking the heat exchanger plate to the elevated portion and being retracted in order to release the heat exchanger plate from the elevated portion.

15. A method for simultaneous stencil printing of brazing material onto elevations, areas surrounding port openings, and a circumferential skirt of a heat exchanger plate, comprising the steps of:
   placing the heat exchanger plate in an opening of a lower stencil printing stencil, and bringing an inner surface of the lower stencil printing stencil to contact an outer perimeter of the circumferential skirt of the heat exchanger plate,
   placing an upper stencil on the heat exchanger plate,
   applying the brazing material to the elevations and the areas surrounding port openings of the heat exchanger plate through openings and ring-shaped openings in the upper stencil, and
   applying the brazing material to the circumferential skirt through brazing material exits in the inner surface of the lower stencil printing stencil.

16. A method according to claim 15, comprising the step of conveying the brazing material to the brazing material exits by canals arranged between circumferential openings of the upper stencil and the brazing material exits.

* * * * *